Patented Oct. 6, 1936

2,056,765

UNITED STATES PATENT OFFICE 2,056,765

CHROMIUM ALLOY STEEL AND WELDING ROD

Frederick M. Becket, New York, and Russell Franks, Jackson Heights, N. Y., assignors, by mesne assignments, to Union Carbide and Carbon Corporation, a corporation of New York No Drawing. Application July 28, 1934, Serial No. 737,385

4 Claims. (Cl. 75—126)

The invention is an alloy and a welding rod made therefrom.

Patent 1,954,344, issued April 10, 1934, to Frederick M. Becket and Russell Franks, contains a description of chromium steel containing additions of columbium acting to increase the ductility and softness of the steel.

We have found that steels containing columbium tend to lose excessive amounts of this constituent when they are melted by an oxyacetylene torch or an electric arc during welding operations unless an effective amount of silicon is present. The following table A of test data illustrates this fact. The welds of these tests were made in twelve-gage sheet, using one-eighth inch welding rods and the electric arc method. A suitable flux, containing no uncombined metal, was employed.

Table A

| Analysis of welding rod | | | | Percent Cb in deposited metal | Recovery of Cb (percent) |
| --- | --- | --- | --- | --- | --- |
| Percent Cr | Percent C | Percent Cb | Percent Si | | |
| 6.32 | 0.04 | 0.70 | 0.30 | 0.20 | 29 |
| 6.63 | 0.06 | 0.76 | 0.43 | 0.25 | 33 |
| 6.31 | 0.07 | 1.50 | 0.60 | 0.98 | 65 |
| 6.36 | 0.07 | 1.49 | 1.12 | 1.23 | 82 |
| 6.20 | 0.06 | 2.11 | 2.09 | 1.98 | 94 |

We have also found that silicon in substantial amounts tends to improve the ductility and softness of the chromium-columbium steels. This effect of silicon is illustrated by the data in table B, wherein Brinell hardness numbers are given for certain steel compositions, the steel in each instance being in the as-rolled condition.

Table B

| Analysis of Steel | | | | Brinell Number |
| --- | --- | --- | --- | --- |
| Percent Cr | Percent C | Percent Cb | Percent Si | |
| 5.62 | 0.09 | 1.04 | 0.41 | 208 |
| 6.48 | 0.09 | 1.80 | 0.78 | 179 |
| 6.36 | 0.07 | 1.49 | 1.12 | 166 |
| 6.20 | 0.06 | 2.11 | 2.09 | 156 |

The present invention is based on the above described discoveries and is an alloy steel, and a welding rod made therefrom, comprising about 2% to 30% chromium, about 0.01% to 0.5% carbon, about 0.1% to 5% columbium, about 1% to 2.5% silicon, and the remainder principally iron. Several per cent. manganese and up to about 4% tantalum may also be present. The columbium content should be at least four times, and is preferably at least eight to ten times, the carbon content. The columbium content preferably exceeds the tantalum content. Especially valuable compositions include those having a chromium content between about 4% and about 10%, those which have a carbon content not greater than about 0.3%, and those which contain less than about 3% columbium.

The welding rod of the invention preferably contains no more than about 2% silicon when the oxyacetylene process is used and no more than about 1% silicon when the electric arc process is used.

We claim:

1. An alloy steel having substantially the composition: 2% to 30% chromium; 0.01% to 0.3% carbon; 0.1% to 3% columbium, the columbium content being at least about eight times the carbon content; more than 1% but not exceeding 2.5% silicon; the remainder substantially all iron.

2. An alloy steel having substantially the composition: 4% to 10% chromium; 0.01% to 0.3% carbon; 0.1% to 3% columbium, the columbium content being at least about ten times the carbon content; more than 1% but not exceeding 2.5% silicon; the remainder substantially all iron.

3. A welding rod having substantially the composition: 2% to 30% chromium; 0.01% to 0.3% carbon; 0.1% to 3% columbium, the columbium content being at least about eight times the carbon content; more than 1% but not exceeding 2.5% silicon; the remainder substantially all iron.

4. A welding rod having substantially the composition: 4% to 10% chromium; 0.01% to 0.3% carbon; 0.1% to 3% columbium, the columbium content being at least about ten times the carbon content; more than 1% but not exceeding 2.5% silicon; the remainder substantially all iron.

FREDERICK M. BECKET.
RUSSELL FRANKS.